Figure 1:
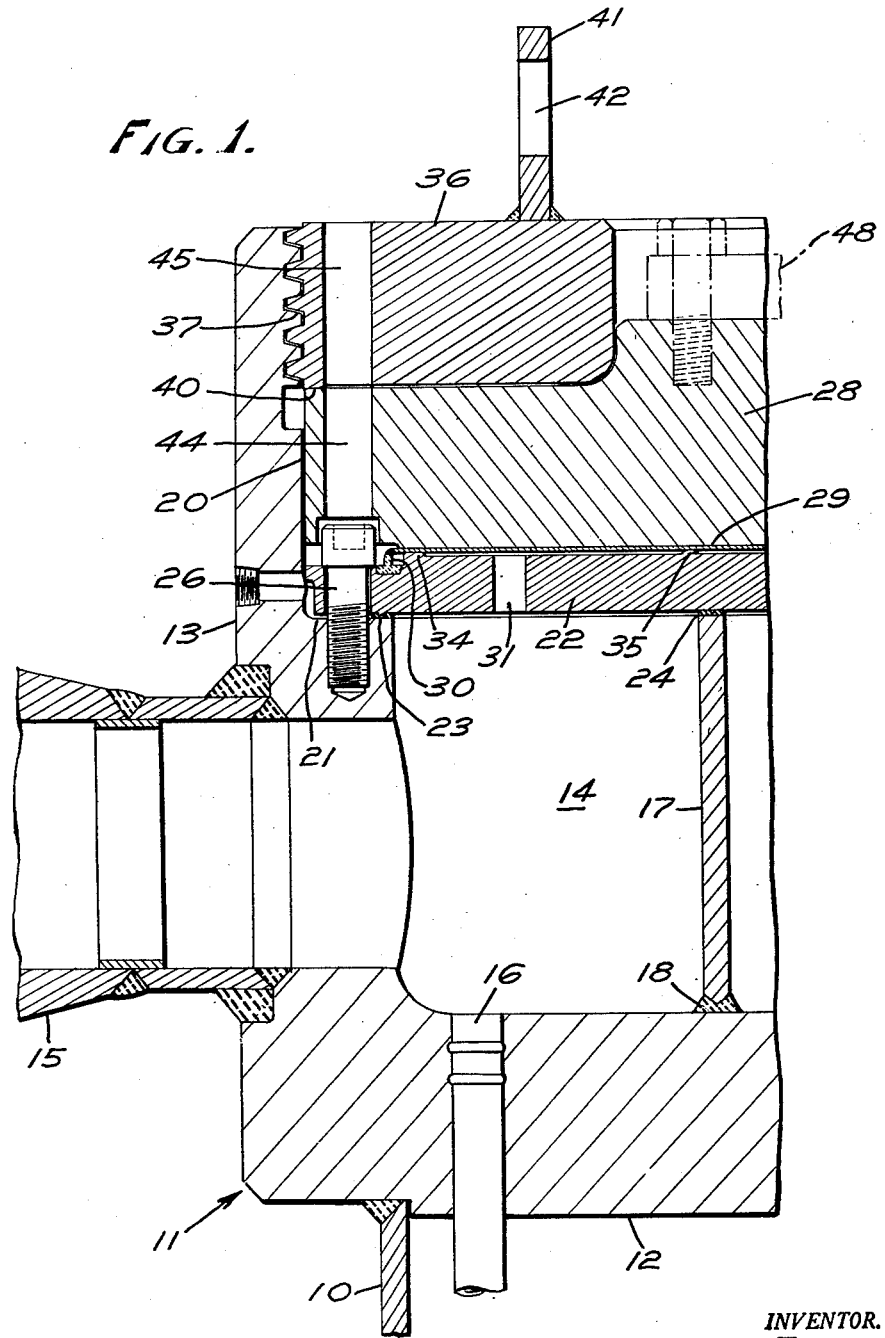

Dec. 17, 1957   T. TINKER   2,816,679
HIGH PRESSURE CLOSURE
Filed March 3, 1955   2 Sheets-Sheet 1

INVENTOR.
TOWNSEND TINKER
BY
Beau, Brooks, Buckley & Beau,
ATTORNEYS.

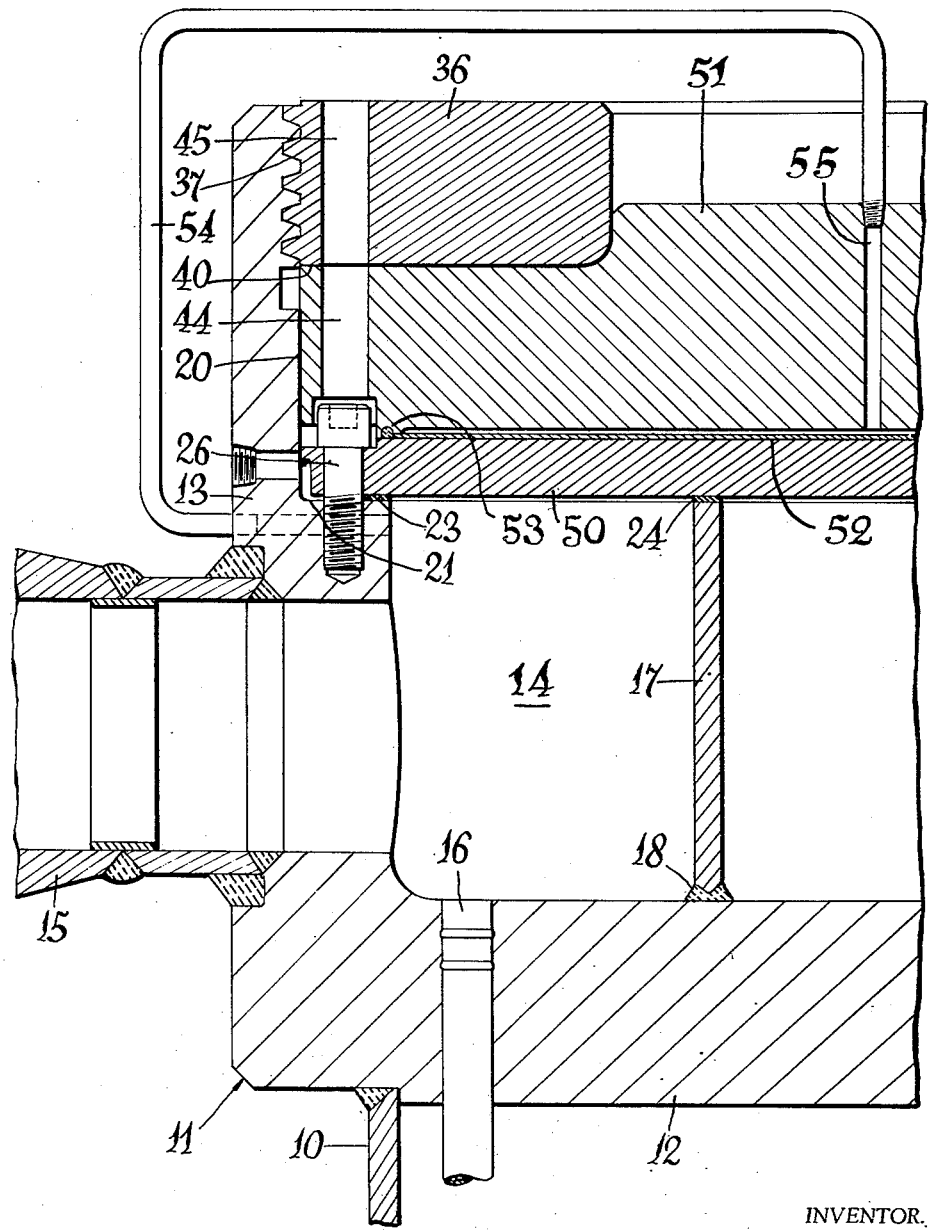

though the upper left hand corner of a cylindrical pressure vessel which extends vertically as viewed in the drawing. The vessel has a main cylindrical body portion 10 and a head member welded to the upper end thereof, the head member being designated generally by the numeral 11 and comprising a radial wall portion 12 which in the present instance provides a tube sheet for a tube-type heat exchanger. Head member 11 further includes a cylindrical portion 13 which extends axially outwardly from the pressure vessel proper (upwardly as viewed in the drawing).

United States Patent Office 2,816,679
Patented Dec. 17, 1957

2,816,679
HIGH PRESSURE CLOSURE

Townsend Tinker, Orchard Park, N. Y., assignor, by mesne assignments, to American Radiator & Standard Sanitary Corporation, New York, N. Y., a corporation of Delaware Application March 3, 1955, Serial No. 492,005

11 Claims. (Cl. 220—20)

This invention relates to closures for pressure vessels and more particularly to covers or closure members for high pressure heads for heat exchangers and similar apparatus.

The problem of sealing vessels against high internal pressures by means of removable closure heads has been the subject of a great deal of design and research activity.

Due to the extremely high internal pressures encountered in many pressure vessels of the present day the problems of maintaining an adequate seal and distributing and transmitting the stresses resulting from the high internal pressures present many problems.

It has heretofore been proposed to provide inner and outer closure or cover members with an open fluid pressure connection between the interior of the vessel proper and the space between the inner and outer cover members. In this way the inner cover member is in a state of something approaching hydrostatic pressure equilibrium so that the means employed for pressuring a gasket between the inner cover member and the vessel proper does not have to bear the force of the internal pressure in the vessel which acts against the cover means generally in one way or another. Despite the obvious theoretical advantage afforded by this type of design, it has not been adopted to as great an extent as might be in the practical art of very large pressure vessels which carry extremely high internal pressures.

The present invention provides a closure organization which takes advantage of the general idea and arrangement of having an inner gasket pressing cover which does not bear the main outward pressure force of the pressure within the vessel and which overcomes many previously insuperable objections and undesirabilities attending the use of this type of closure. Furthermore, in the arrangement of the present invention the inner cover member and its gasket sealing means, besides being free and independent of the outward fluid pressure within the vessel, is maintained under proper gasket sealing pressure without dependence on the outer cover or retaining structure. In the prior art the inner cover is frequently retained by setscrews or the like which are supported in the outer cover or retaining means.

The present invention provides a novel diaphragm arrangement whereby the outward force of the fluid pressure within the vessel is transmitted to the outer cover member in a manner which permits no fluid pressure escape at or about the outer cover member, the only sealing means being the gasket between the inner cover member and the pressure vessel proper, the holding means for such sealing or gasketing being substantially free of the main fluid pressure force within the vessel. The diaphragm arrangement of the present invention completely isolates the fluid within the vessel and between the inner cover and the diaphragm from the outer cover. The outer cover requires no sealing or gasket arrangement of any kind.

Furthermore, the screws which maintain gasket pressure against the inner cover member are freely accessible while the vessel is fully pressured and the closure means completely assembled and adjustment of such gasket screws is relatively easily accomplished since substantially the only forces which they bear are the gasket pressing forces. Also, the inner cover gasket holding screws act directly against the inner cover and no back-up ring or other extraneous parts are required.

Still further, the outer cover retaining arrangement of the present invention is such that the large outward forces received by the outer cover member from the aforesaid diaphragm are transmitted to the vessel proper by a threaded connection between a retaining ring and the vessel proper with the threaded connection subject oly to a simple shearing stress. The unitary annular threaded retaining ring which thus receives and transmits the fluid pressure load from the outer cover member to the body of the vessel proper is a substantial improvement over the usual segmental shear keys since it requires no extraneous means or members for maintaining it in properly assembled stress-transmitting relationship with the body of the vessel.

The threaded retainer ring and the outer cover member, besides transmitting the pressure vessel forces in this direct, simple and structurally efficient manner, are not encumbered with other extraneous loads and forces, the gasket pressure, for instance, being applied entirely independently of the outer cover member and retaining ring. Thus the stresses in the retaining ring cannot affect the gasket holding screws or otherwise relax the gasket sealing force. Only a single set of direct acting gasket tightening screws are required, the screws being in tension and not subject to compressive deflection as in certain prior art arrangements.

While typical embodiments of the principles of the present invention are set forth in detail herein by way of example it is to be understood that the scope of the invention is not necessarily limited thereto or otherwise than as defined in the appended claims.

In the drawings Fig. 1 is a fragmentary cross sectional view taken longitudinally through a corner of a pressure vessel provided with one form of the closure of the present invention; and Fig. 2 is a similar view of a modified form of the closure of the present invention.

Fig. 1 of the drawing shows what may be considered the upper left hand corner of a cylindrical pressure vessel which extends vertically as viewed in the drawing. The vessel has a main cylindrical body portion 10 and a head member welded to the upper end thereof, the head member being designated generally by the numeral 11 and comprising a radial wall portion 12 which in the present instance provides a tube sheet for a tube-type heat exchanger. Head member 11 further includes a cylindrical portion 13 which extends axially outwardly from the pressure vessel proper (upwardly as viewed in the drawing).

Pressure fluid such as high pressure water or superheated steam may enter the head space 14 by way of an inlet conduit 15 and the numeral 16 designates, merely by way of example, one of the usual plurality of tubes fixed in tube sheet 12. A conventional pass plate 17 is welded within the head space 14 as at 18, to divide the head space into inlet and outlet portions, all of the foregoing being generally conventional construction in high pressure heat exchanger vessels of this general class and well known to those skilled in the art to which the present invention relates.

The novel high pressure closure means in the form illustrated in Fig. 1 by way of example will now be described in detail. The interior of the head member 11 outwardly of the head space 14 is enlarged by a counterbore 20 which forms an annular radially extending gasket-receiving ledge or land 21. An inner cover plate 22 seats against a gasket 23 on ledge 21 and likewise seals off pass plate 17 by way of a gasket 24.

Sealing pressure is applied directly to gasket 23 by a series of socket head screws 26 which pass through inner cover plate 22 and thread into the ledge 21 of head member 11. An outer cover plate which relieves the inner cover plate of the internal fluid pressure load in a manner which will presently appear is designated 28. A diaphragm 29 is disposed at the outer side of inner cover plate 22 and is fixed integrally thereto about its marginal edges.

An integral annular wall 30 is built up on inner cover member 22 as by means of depositing weld metal thereon, in the present instance a stainless steel weld being employed. Diaphragm 29 is fused to the upper edge of wall 30 to form a hermetically sealed relatively flat radially extending space above inner cover plate 22, between such cover plate and the diaphragm 29.

An opening 31 in inner cover plate 22 transmits the fluid pressure in head space 14 to this space above the inner cover member and thus substantially balances fluid pressure at opposite sides of the inner cover member, the diaphragm 29 bearing directly upwardly against outer cover member 28 substantially throughout its surface, as clearly shown in Fig. 1.

Thus the gasket pressuring screws 26 are substantially entirely relieved of the fluid pressure load and are subject only to the primary tensile stresses involved in applying adequate gasket pressure. The diaphragm 29 is preferably held in a position slightly spaced from the upper surface of inner cover plate 22 by several annular or arcuate lands such as at 34 and 35 in Fig. 1.

The internal fluid pressure of the vessel which is applied to outer cover member 28 by way of diaphragm 29 is transmitted to head member 11 by way of a retainer ring 36 which threads into the open upper or outer end of head member 11 as at 37. Either the outer cover member 28 or the retainer ring 36 is relieved throughout most of their facing or contiguous surfaces so that they abut only along a peripheral marginal portion as shown at 40 in Fig. 1.

An important object of the invention is attained through this relationship since the extreme outward force on the outer cover member 28 as a result of the high internal pressure of the vessel is applied in turn to the retainer ring in such manner that it is transmitted to the threads 37 substantially entirely as a simple shearing stress without any material moment tending to twist the retainer ring or similarly distort its related parts.

In Fig. 1 the numeral 41 designates one of a plurality of lugs arranged in diametrically opposed pairs upon and fixed to retainer ring 36 by welding or otherwise, the lugs 41 having openings 42 to receive a bar to facilitate turning the retainer ring 36 to thread the same into assembled position. Since outer cover member 28 will be applied and removed with the vessel unpressured, and since the outer cover member 28 and retainer ring 36 are subject to no other or extraneous loads or forces, the forces required in thus assembling and disassembling the retainer ring are not of great magnitude.

Outer cover member 28 and retainer ring 36 are provided with access holes 44 and 45, respectively, which are in registry with each other and with the screws 26 when the parts are assembled as shown in the drawing. The upper surfaces of retainer ring 36 and head member 11, adjacent to the threads 37, may be provided with matching punch marks to facilitate registry of the access openings in applying the retainer ring 36. Thus the inner cover gasket pressure may readily be taken up by manipulation of the socket head screws 26 through the openings 44 and 45 without disturbing the outer cover and retainer ring assembly and yet without acting against the internal pressure of the vessel.

Outer cover plate 28 has a circular series of tapped holes by means of which a lifting fixture shown fragmentarily in dot and dash lines at 48 in the drawing may be secured to outer cover plate 28 and thus outer cover plate 28 and retainer ring 36 may be lifted from the vessel together after the retainer ring has been unscrewed or may be lifted into position in the upper end of head member 11 upon assembly.

Fig. 2 shows an alternative construction which is provided by attaching and sealing the marginal portion of the diaphragm to the inner face of the outer cover member instead of to the outer face of the inner cover member. In such case the pressure equalizing passage through the inner cover member is omitted and an external pressure equalizing conduit leading from the head space enters the upper side of the outer cover member. The manner in which this construction balances the static pressure at opposite sides of the inner cover member and causes the outer cover member to bear the outward pressure from the head space is the same in principle as that of the embodiment of Fig. 1.

In general, the numerals applied to the various parts in Fig. 2 are the same as in Fig. 1 and the general description of the closure will not be repeated here excepting as to parts which are modified for the purpose of this embodiment. In Fig. 2 the inner cover member is designated 50, the outer cover member is designated 51 and a diaphragm 52 is welded at its marginal edges to the inner face of the outer cover member as at 53. A pressure equalizing conduit 54 communicates with the interior of the head space 14 and a passage 55 therefrom leads to the space between outer cover member 51 and diaphragm 52.

What is claimed is:

1. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member, a retainer ring threaded into said open end and bearing inwardly against the outer cover member, and a diaphragm sealed peripherally to the outer surface of the inner cover member and abutting the inner surface of the outer cover member, said inner cover member having an opening therethrough whereby substantially equal fluid pressures prevail within said pressure vessel and between said inner cover member and said diaphragm, said outer cover member and said retainer ring having access holes in registry with said screws to permit adjustment of the latter without disassembly of the closure means.

2. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member including means acting between the outer cover member and said vessel to transmit outward pressure forces acting against the outer cover member to said vessel, and a diaphragm sealed peripherally to the outer surface of the inner cover member and abutting the inner surface of the outer cover member, said inner cover member having an opening therethrough whereby substantially equal fluid pressures prevail within said pressure vessel and between said inner cover member and said diaphragm, said outer cover member having access holes in registry with said screws to permit adjustment of the latter without disassembly of the closure means.

3. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member including means acting between the outer cover member and said vessel to transmit outward pressure forces acting against the outer cover member to said vessel, and a diaphragm between said cover members and abutting the inner surface of the outer cover member, said inner cover member having an opening therethrough whereby substantially equal fluid pressures prevail within said pressure vessel and between said inner cover member and said diaphragm, said outer cover member having access holes in registry with said screws to permit adjustment of the latter without disassembly of the closure means.

4. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member, a retainer ring threaded into said open end and bearing inwardly against the outer cover member, and a diaphragm between said cover members and abutting the inner surface of the outer cover member, said inner cover member having an opening therethrough whereby substantially equal fluid pressures prevail within said pressure vessel and between said inner cover member and said diaphragm, said outer cover member and said retainer ring having access holes in registry with said screws to permit adjustment of the latter without disassembly of the closure means.

5. Pressure vessel means comprising a hollow cylinder having an open end and closure means therefor comprising inner and outer cover members, a transverse partition in said hollow cylinder, gasket means between said inner cover member and said hollow cylinder and between said inner cover member and said partition, retaining means bearing axially inwardly against the outer cover member, and a diaphragm sealed peripherally to the outer surface of the inner cover member and bearing against the inner surface of the outer cover member, said inner cover member having an opening therethrough whereby substantially equal fluid pressures prevail within said hollow cylinder and between said inner cover member and said diaphragm.

6. Pressure vessel means comprising a hollow cylinder having an open end and closure means therefor comprising inner and outer cover members, a transverse partition in said hollow cylinder, gasket means between said inner cover member and said hollow cylinder and between said inner cover member and said partition, retaining means bearing axially inwardly against the outer cover member, and a diaphragm between said cover members and sealed peripherally to one cover member and bearing against the other, and fluid pressure equalizing passage means between the interior of said hollow cylinder and the space between said diaphragm and the cover member to which it is sealed.

7. Pressure vessel means comprising a hollow cylinder having an open end and closure means therefor comprising inner and outer cover members, a transverse partition in said hollow cylinder, gasket means between said inner cover member and said hollow cylinder and between said inner cover member and said partition, retaining means bearing axially inwardly against the outer cover member, and a diaphragm sealed peripherally to the inner surface of the outer cover member and bearing against the outer surface of the inner cover member, said outer member having an opening therethrough and a conduit leading from the outer end of said opening to the interior of said hollow cylinder whereby substantially equal pressures prevail within said hollow cylinder and between said outer cover member and said diaphragm.

8. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member, a retainer ring threaded into said open end and bearing inwardly against the outer cover member, and a diaphragm between said cover members and abutting the inner surface of the outer cover member, said inner cover member having an opening therethrough whereby substantially equal fluid pressures prevail within said pressure vessel and between said inner cover member and said diaphragm.

9. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member including means acting between the outer cover member and said vessel to transmit outward pressure forces acting against the outer cover member to said vessel, and a diaphragm between said cover members and abutting the inner surface of the outer cover member, said inner cover member having an opening therethrough whereby substantially equal fluid pressures prevail within said pressure vessel and between said inner cover member and said diaphragm.

10. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member, a retainer ring threaded into said open end and bearing inwardly against the outer cover member, a diaphragm between said cover members and abutting the inner surface of the outer cover member, and pressure conduit means between the interior of the pressure vessel and the space between the diaphragm and the inner cover member whereby substantially equal fluid pressures prevail within said pressure vessel and between said inner cover member and said diaphragm, said outer cover member and said retainer ring having access holes in registry with said screws to permit adjustment of the latter without disassembly of the closure means.

11. A pressure vessel having an open end and closure means therefor, said vessel having an annular outwardly facing ledge spaced axially inwardly of the open end thereof and a transverse partition terminating substantially in the plane of said ledge, gasket means on said ledge and said transverse partition and an inner cover member seated on said gasket means, screws passing through the inner cover member with their shank portions threaded into said annular ledge to clamp the gasket means between the inner cover member and said ledge and said partition, an outer cover member, a retainer ring threaded into said open end and bearing inwardly against the outer cover member, a diaphragm between said cover members and abutting the inner surface of the outer cover member, and pressure conduit means between the interior of the pressure vessel and the space between the diaphragm and the inner cover member whereby substantially equal fluid pressures prevail within said pressure vessel and between said inner cover member and said diaphragm.

References Cited in the file of this patent

UNITED STATES PATENTS

| | | |
|---|---|---|
| 1,449,701 | Schmidt | Mar. 27, 1923 |
| 1,617,451 | Kniskern | Feb. 15, 1927 |
| 2,009,877 | Dodd | July 30, 1935 |
| 2,219,659 | Price | Oct. 29, 1940 |
| 2,247,105 | Tinker | June 24, 1941 |
| 2,273,186 | Fischer | Feb. 17, 1942 |